United States Patent
Davies et al.

(10) Patent No.: US 6,526,490 B2
(45) Date of Patent: Feb. 25, 2003

(54) DATA PROCESSING SYSTEMS WITH PROCESS MONITOR

(75) Inventors: John Alun Davies, Highnam (GB); James Frederick Moore, Bristol (GB); Peter John Stevens, Clearwell (GB); Denis Vaughan Weale, Bristol (GB)

(73) Assignee: Smiths Group PLC, London (GB)

( * ) Notice: Subject to any disclaimer, the term of this patent is extended or adjusted under 35 U.S.C. 154(b) by 83 days.

(21) Appl. No.: 09/801,654

(22) Filed: Mar. 9, 2001

(65) Prior Publication Data

US 2001/0021968 A1 Sep. 13, 2001

(30) Foreign Application Priority Data

Mar. 9, 2000 (GB) .............................................. 0005535

(51) Int. Cl.[7] ................................................. G06F 9/22
(52) U.S. Cl. ........................ 711/164; 711/154; 711/156; 711/163; 711/167
(58) Field of Search ................................ 711/154, 156, 711/163, 164, 167, 170

(56) References Cited

U.S. PATENT DOCUMENTS

| | | | | |
|---|---|---|---|---|
| 4,104,721 A | * | 8/1978 | Markstein et al. .......... | 711/164 |
| 5,854,913 A | * | 12/1998 | Goetz et al. ................. | 711/207 |
| 5,968,136 A | * | 10/1999 | Saulpaugh et al. ......... | 709/312 |
| 6,055,650 A | * | 4/2000 | Christie ....................... | 710/15 |
| 6,202,130 B1 | * | 3/2001 | Scales et al. ............... | 711/137 |

* cited by examiner

*Primary Examiner*—Than Nguyen
(74) *Attorney, Agent, or Firm*—Connolly Bove Lodge & Hutz LLP

(57) ABSTRACT

A processing system has a processor with a memory map identifying locations in a memory where data are stored, data associated with an application being stored at the same location every time an application is run. The processor runs each application during specified processing time slots. A monitor contains information as to the memory locations associated with each application and the time slots during which each application should be run. The monitor also has a register containing a keyword, which is compared with a keyword supplied by the processor 1 when it switches between user mode and supervisory mode so that the monitor denies access to memory locations associated with the other mode.

2 Claims, 1 Drawing Sheet

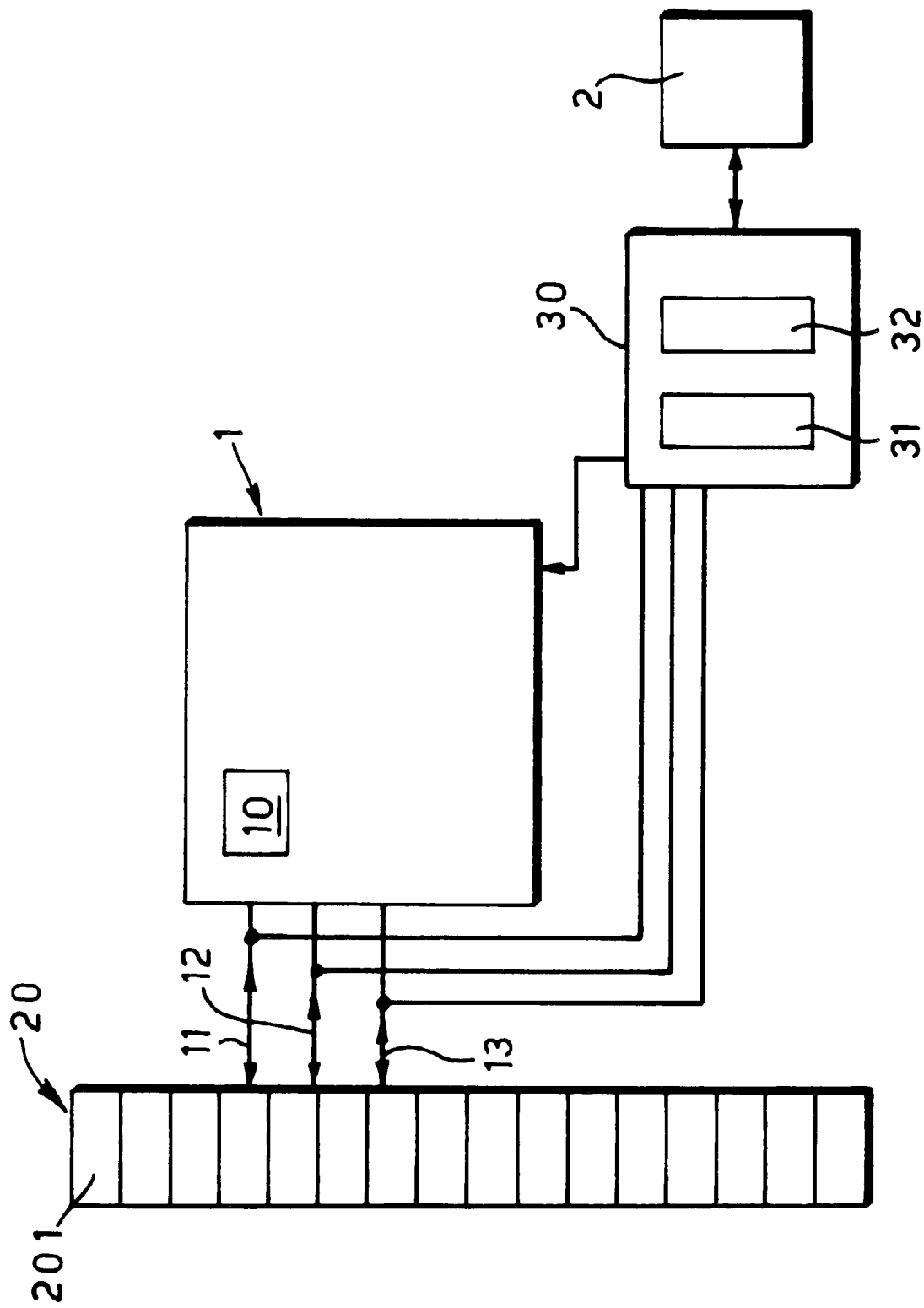

DATA PROCESSING SYSTEMS WITH PROCESS MONITOR

BACKGROUND OF THE INVENTION

This invention relates to processing systems.

Processing systems used in aviation and military applications are usually specially built and tested to ensure that they operate predictably. There is, however, increasing pressure on manufacturers to reduce cost of equipment by using commercial off-the-shelf (COTS) components. Commercially available processors are, however, not suitable for use in high integrity applications for several reasons. For example, although the operating system of the microprocessor contains a memory map indicating the location within the memory at which various items of programs and data are stored, the same items of data are not generally located at the same location every time that the processor is turned on. Because data is not located in the same memory partition every time, there can, for example, be no guarantee that data is always contained in memory partitions that have sufficient capacity or that have been tested to the required standard for a particular application. Also, where several different software applications are run on a processor simultaneously, the operating system usually runs the different applications in time-slots, which are usually allocated arbitrarily. This can result in some applications having insufficient allocated time to run reliably every time, whereas less important applications might have more time allocated than is strictly necessary.

In operation, microprocessors function in one of two different modes, namely a User Mode and a Supervisor Mode. Applications programs run entirely in the User Mode whereas the Supervisor Mode is more powerful and is used to provide operating system services to the User Mode and to run the operating system of the processor. Conventional processors switch from the User Mode to the Supervisor Mode either at the end of a time period allocated for a particular application or when the application calls for services from the User Mode. There is generally no indication whether the processor is running in User Mode or in Supervisor Mode. This contributes to uncertainty about the operation of the processor system, which is not acceptable in high integrity systems.

Systems are available that avoid these problems, but these require special fabrication not generally suitable for use with commercially available processors.

BACKGROUND OF THE INVENTION

It is an object of the present invention to provide an improved processing system.

According to one aspect of the present invention there is provided a processing system including a processor, a memory and a monitor, the processor being connected with the memory, the processor including a memory map identifying locations within the memory at which specified data are stored, the memory map being arranged such that data associated with an application are stored at the same location every time an application is run, the processor being arranged to run each application during specified processing time slots, the monitor containing information as to the memory location where data associated with each application are stored and containing information as to the time slots during which the processor should be running each application, the monitor being connected such as to receive signals indicative of the memory locations being addressed and the application being run, and the monitor being arranged to check whether the correct memory locations are being addressed and whether the correct application is being run in a given time slot.

According to another aspect of the present invention there is provided a processing system including an applications processor, a memory and a monitor, the processor being connected with the memory and the monitor, and the processor being operable in two different modes in which it has access to respective different memory locations, the monitor containing a store of at least one keyword, the processor being arranged to supply a keyword to the monitor when it switches between the two different modes, the monitor being operable to compare the keyword supplied by the processor with the keyword stored in the monitor, and the monitor being arranged to deny access by the processor to memory locations associated with a mode if the keyword supplied by the processor is not compatible with the keyword in the monitor.

The memory preferably includes a flash memory containing software relating to the applications to be run on the system and downloadable to other locations in the memory.

A processing system and its method of operation according to the present invention, will now be described, by way of example, with reference to the accompanying drawing.

BRIEF DESCRIPTION OF THE DRAWINGS

The accompanying drawing shows the system schematically.

DETAILED DESCRIPTION OF THE PREFERRED EMBODIMENT

The system includes a processor 1 and a memory 20. The processor 1 may be of a conventional kind and includes a memory map unit 10 specifying locations in memory at which different data are to be stored. The processor 1 is used to run various software program applications.

The memory 20 has numerous different locations within it that can be individually addressed to provide partitioned storage of data. It will be appreciated that this memory 20 need not be a single unit but could be made up of any number of separate units. The memory 20 may include a flash memory 201 in which all the software relating to the applications to be run on the system are stored and from which the software can be downloaded to other locations within the memory. The memory 20 is connected with the processor 1 via three data channels 11, 12 and 13. One data channel 11 carries information as to address locations within the memory 20; the second channel 12 carries data to be supplied to or from the memory at the address specified on the first channel; and the third channel 13 specifies whether data is to be written into the memory or read out from it. These three channels 11 to 13 may be provided by a single databus.

The system includes an additional component in the form of a monitor device 30, which functions to check operation of the system. The monitor 30 is connected to a device 2 in the form of an EPROM or processor so that information from the device is supplied to the monitor. The device 2 contains parameters determined during design of the system, which define allowable memory access rights and run duration times. The device 2 may also manage violations by either forcing the processor 1 to stop or producing a warning or alarm. The monitor 30 is also connected to the three channels 11 to 13 so that the monitor receives information from these three channels. The monitor 30 includes a store 31 of information concerning the locations or partitions within the memory 20 at which different items of data are to be stored and information concerning the time slots during which specified applications are to be run. The monitor 30 also includes registers 32 containing keywords for comparison with keywords supplied to the monitor.

The processor 1 switches between User Mode UM and Supervisor Mode SM according to whether it is running an application or whether it carrying out some other function. The processor 1 switches between these two modes by means of an Application Program Interface API, which is a high assurance software layer. In the present invention, the API is arranged to send a keyword to the monitor 30 whenever it is requested to change from UM to SM and sends a different keyword whenever it returns to UM. If the keyword transmitted by the API corresponds with that stored in the register 32 in the monitor 30, the monitor enables access by the processor 1 to those partitions of the memory 20 reserved exclusively for use in the Supervisor Mode. If the keyword does not correspond, the monitor provides a signal to the processor 1 to indicate a malfunction. From the data from channels 11 to 13 and from the I/O processor 2, the monitor 30 is aware which application is being run and which memory partition access has been requested. If the memory partition requested is inappropriate for the application being run, the monitor 30 refuses access, even if the correct keyword is sent.

The monitor 30 also monitors when an application commences and terminates on the processor and the memory partitions being accessed at any time. Stores 31 in the monitor 30 define sequences of time and memory address maps, which cycle around repetitively. If the appropriate memory partition is not being accessed in the appropriate time slot, the monitor 30 indicates a malfunction to the processor 1.

The system of the present invention can be applied readily to conventional COTS processors without excessive modification. It can also be used with a wide variety of different processors and is relatively immune to changes in design of processors.

What we claim is:

1. A processing system comprising: a memory having a plurality of locations; a processor, said processor being connected with said memory and including a memory map identifying locations within said memory at which specified data are stored, wherein said memory map is arranged such that data associated with an application are stored at the same location every time an application is run, and wherein said processor is arranged to run each application during specified processing time slots; and a monitor, said monitor containing information as to locations in said memory where data associated with each application are stored and containing information as to the time slots during which said processor should be running each application, wherein said monitor is connected such as to receive signals indicative of memory locations being addressed and application being run, and wherein said monitor is arranged to check whether the correct memory locations are being addressed and whether the correct application is being run in a given time slot.

2. A system according to claim 1, wherein said memory includes a flash memory containing software relating to the applications to be run on said system and downloadable to other locations in said memory.

\* \* \* \* \*